United States Patent [19]

Saya et al.

[11] Patent Number: 5,508,581
[45] Date of Patent: Apr. 16, 1996

[54] ULTRASONIC MOTOR WITH A STATOR AND A MOBILE ELEMENT MADE OF IMPROVED MATERIALS

[75] Inventors: Daisuke Saya, Urayasu; Takatoshi Ashizawa, Kawasaki; Ryoichi Suganuma, Yokohama, all of Japan

[73] Assignee: Nikon Corporation, Tokyo, Japan

[21] Appl. No.: 356,978

[22] Filed: Dec. 16, 1994

[30] Foreign Application Priority Data

Dec. 17, 1993 [JP] Japan ................... 5-344247

[51] Int. Cl.⁶ ............................................. H01L 41/08
[52] U.S. Cl. ............................................. 310/323
[58] Field of Search ................................ 310/323, 328

[56] References Cited

U.S. PATENT DOCUMENTS

| | | | |
|---|---|---|---|
| 4,102,973 | 7/1978 | Hanning | 264/272.2 |
| 4,739,212 | 4/1988 | Imasaka et al. | 310/323 |
| 4,939,404 | 7/1990 | Inagaki et al. | 310/323 |
| 4,963,781 | 10/1990 | Sumihara et al. | 310/323 |
| 5,013,956 | 5/1991 | Kurozumi et al. | 310/323 |
| 5,059,849 | 10/1991 | Sumihara et al. | 310/323 |

FOREIGN PATENT DOCUMENTS

| | | |
|---|---|---|
| 62-196082 | 8/1987 | Japan . |
| 63-103674 | 5/1988 | Japan . |
| 63-136986 | 6/1988 | Japan . |
| 63-140679 | 6/1988 | Japan . |
| 63-181680 | 7/1988 | Japan . |
| 63-257475 | 10/1988 | Japan . |
| 63-257477 | 10/1988 | Japan . |
| 63-265574 | 11/1988 | Japan . |
| 1-248975 | 10/1989 | Japan . |

Primary Examiner—Mark O. Budd

[57] ABSTRACT

An ultrasonic motor having a stator and a mobile element made of improved materials. The ultrasonic motor includes an electro-mechanical conversion element, a stator and a mobile element. The electro-mechanical conversion element creates oscillations when an electrical signal is applied to the electro-mechanical conversion element. The stator is joined to the electro-mechanical conversion element and includes a stator contact part. The mobile element includes a mobile element contact part in contact with the stator contact part. When an electrical signal is applied to the electro-mechanical conversion element, the electro-mechanical conversion element creates oscillations in the stator contact part to drive the mobile element. Either the stator contact part and/or the mobile element contact part is made of a plastic material which has a polyacetol resin as a major component. The plastic material can include a polyolefin resin. Moreover, the plastic material can additionally include at least one of titanium oxide, silica, molybdenum disulfide or carbon powder. By properly selecting the material of the stator contact part and/or the mobile element contact part, the drive efficiency, anti-abrasive characteristics and chemical stability of the ultrasonic motor are improved.

20 Claims, 1 Drawing Sheet

ULTRASONIC MOTOR WITH A STATOR AND A MOBILE ELEMENT MADE OF IMPROVED MATERIALS

BACKGROUND OF THE INVENTION

1. Field of the Invention

The present invention relates to ultrasonic motors comprising a stator and a mobile element and, more particularly, to selecting appropriate materials for the stator and the mobile element.

2. Description of the Related Art

Conventional ultrasonic motors can obtain a high torque during low speeds and are used in a variety of mechanisms. For example, many cameras use conventional ultrasonic motors. Conventional ultrasonic motors consist of a stator in pressure contact with a mobile element. The stator includes an electro-mechanical conversion element and an elastic body. Electrical signals are supplied to the electro-mechanical conversion element and, in response, the electro-mechanical conversion element generates progressive oscillations or vibrations in the elastic body. The mobile element is in pressure contact with the elastic body so that the vibrations in the elastic body act to drive the mobile element via friction between the elastic body and the mobile element. The electro-mechanical conversion element of the stator is typically a piezoelectric material. The performance of conventional ultrasonic motors is largely determined by the part of the stator ("stator contact part") and the part of the mobile element ("mobile element contact part") which are in contact with each other. The stator contact part is typically the elastic body of the stator. Consequently, the selection of the materials for the stator contact part and the mobile element contact part is particularly important. The stator contact part typically consists of metallic materials such as aluminum, steel and stainless steel. The mobile element contact part typically consists of plastic materials.

However, various problems occur in convention ultrasonic motors due to the materials of the stator contact part and the mobile element contact part. For example, the oscillations generated in the elastic body of the stator are not always efficiently converted to a drive force for driving the mobile element, thereby resulting in an increased power consumption of the ultrasonic motor. Moreover, the stator contact part and the mobile element contact part can undergo chemical changes (such as hydrolysis), thereby resulting in the stator and the mobile element becoming firmly affixed to each other. Further, abrasive particles can adhere to the stator contact part and the mobile element contact part, thereby resulting in deteriorating characteristics and reduced performance of the ultrasonic motor.

SUMMARY OF THE INVENTION

Accordingly, it is an object of the present invention to improve the drive efficiency, anti-abrasive characteristics and chemical stability of an ultrasonic motor by properly selecting the materials for the stator contact part and the mobile element contact part.

Objects of the present invention are achieved by providing a motor comprising an electro-mechanical conversion element which creates oscillations when an electrical signal is applied to the electro-mechanical conversion element; a stator joined to the electro-mechanical conversion element and having an stator contact part; and a mobile element having a mobile element contact part in contact with the stator contact part. When an electrical signal is applied to the electro-mechanical conversion element, the electro-mechanical conversion element creates oscillations in the stator contact part to drive the mobile element. At least one of the stator contact part and the mobile element contact part comprise a plastic material which has a polyacetol resin as a major component. The plastic material can also comprise a polyolefin resin. Moreover, the plastic material can additionally comprise at least one of the group comprising titanium oxide, silica, molybdenum disulfide and carbon powder.

BRIEF DESCRIPTION OF THE DRAWING

These and other objects and advantages of the invention will become apparent and more readily appreciated from the following description of the preferred embodiments, taken in conjunction with the accompanying drawing, of which.

DESCRIPTION OF THE PREFERRED EMBODIMENTS

Figure 1:
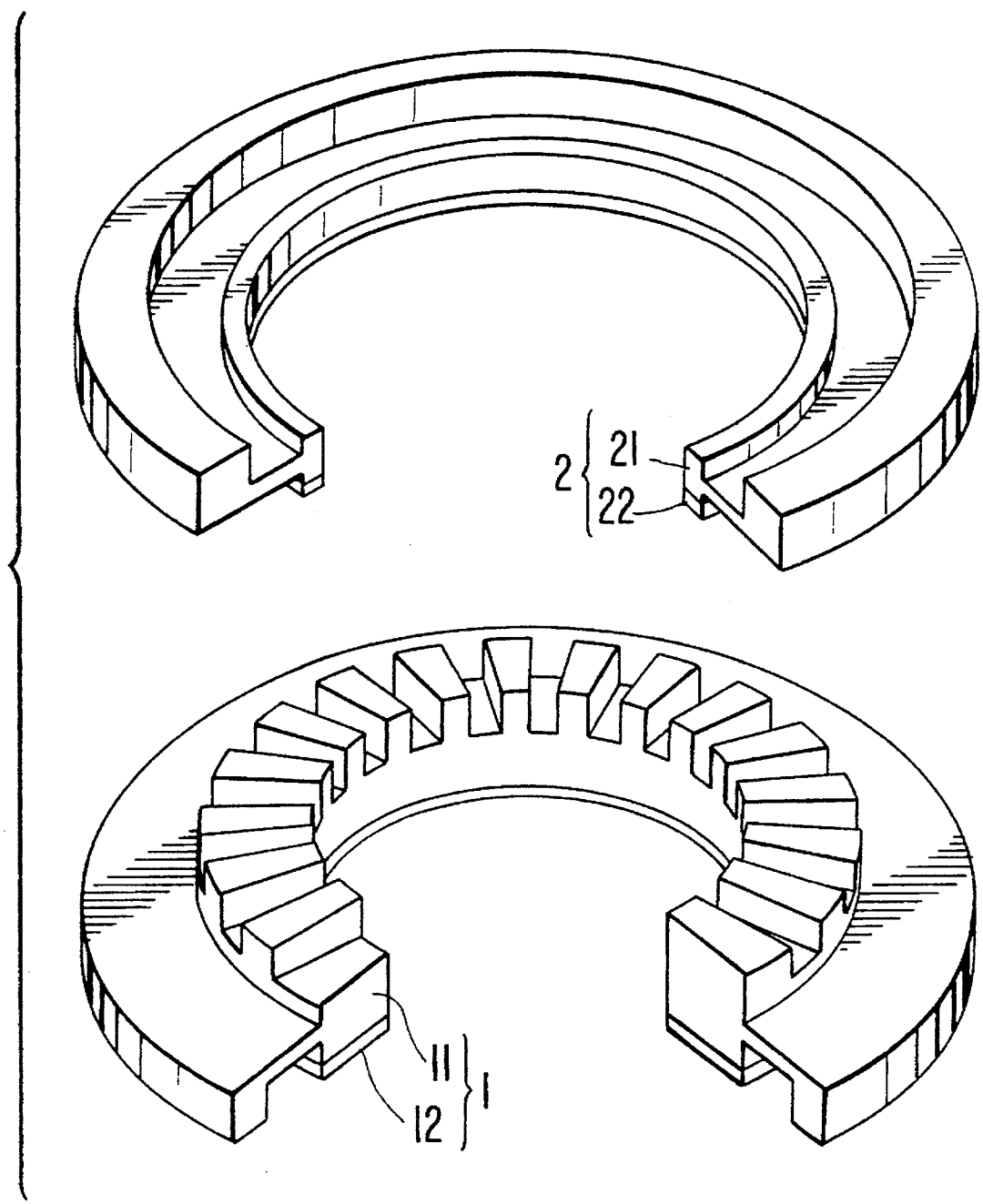
FIG. 1 is a diagram illustrating an oblique view of an ultrasonic motor according to an embodiment of the present invention.

FIG. 1 illustrates an oblique view of an ultrasonic motor according to an embodiment of the present invention. As illustrated in FIG. 1, a stator 1 comprises an elastic body 11 and an electro-mechanical conversion element 12 affixed to elastic body 11. Electro-mechanical conversion element 12 is made of a piezoelectric material. A mobile element 2 comprises a mobile element base member 21 and a slide member 22 affixed to mobile element base member 21. Stator 1 and mobile element 2 are preferably ring shaped and form a complete "ring", although FIG. 1 illustrates a cross section of stator 1 and mobile element 2 so that it appears in FIG. 1 that a portion of stator 1 and a portion of mobile element 2 are removed.

In an ultrasonic motor, elastic body 11 of stator 1 is in pressure contact with slide member 22 of mobile element 2. Thus, elastic body 11 acts as a "stator contact part" of stator 11, and slide member 22 acts as a "mobile element contact part" of mobile element 2. When electric signals are supplied to electro-mechanical conversion element 12, elastic body 11 is excited and progressive oscillations, or vibrations, are generated in elastic body 11. The progressive oscillations cause mobile element 2 to be friction driven. That is, progressive oscillations in elastic body 11 cause mobile element 2 to "slide".

Elastic body 11 is made of a ferrous metallic material. In order to greatly amplify vibrations, multiple grooves are formed in the surface of elastic body 11. Slide member 22 of mobile element 2 is made of a plastic material. Consequently, slide member 22 has superior molding properties and can be easily mass produced. Moreover, slide member 22 is light weight, has relatively good self-lubricating properties and relatively good anti-rust properties. This can be compared to metals, which generally do not have good self-lubricating properties or good anti-rust properties. Slide member 22 and mobile element base member 21 are affixed using, for example, cyano-acrylate group and epoxy group adhesives. Slide member 22 can be made of the following plastic materials:

1. Thermo-hardening resins

Phenol group resins, epoxy resins (EP), unsaturated polyester resins (UP), BT resins, and urethane resins, etc.

2. Thermo reversible resins (A) Polyolefins

High density polyolefin, low density polyolefin, polypropylene, polyisobutylene, polyvinylidene chloride, polytetrafluoro-ethylene (PTFE), etc.

(B) Vinyl compounds

Polyvinyl acetate, polyvinyl chloride, polystyrene, fluorine resins, polyvinyl acetol, methylpolyacrylate, etc.

(C) Polyamides 6 nylon, 6-6 nylon, 6-10 nylon, polyvinyl pyrrolidone, etc.

(D) Saturated polyester group resins

Polyethylene terephthalate (PET), polybutylene terephthalate (PBT), etc.

(E) Polyether group resins

Polyacetol (POM), polyether ether ketone (PEEK), poly ether sulfone (PES), etc.

(F) Other

Denatured PPO, polyphenylene oxide, polyphenylene sulfide (PS), polyacrylonitrile, polyurethane, polycarbonate (PC), silica resin, polytoluene, polyacrylate, polyimide, polyether chloride, polyhydro olefin, polysulfone, polyoxetane, polyethylene oxide, coumarone indene, polyacrylonitrile, polychlorinated vinyl acetate, styrene acrylonitrile (SAN), styrene butadiene (SB), acrylonitrile butadiene styrene copolymer (ABS), styrene acrylonitrile copolymer (AS), cellulose, cellulose acetate, fiber reinforced resin (FRTP), petroleum resin, etc.

TABLE 1

Table of Slide Member Test Samples

| SLIDE MEMBER TEST SAMPLE | MAJOR COMPONENT OF SLIDE MATERIAL |
|---|---|
| SAMPLE A | Polyether ether ketone resin |
| SAMPLE B | Polyether sulfone resin |
| SAMPLE C | PTFE resin |
| SAMPLE D | Polyacetol resin |
| SAMPLE E | BT resin + carbon paper |
| SAMPLE F | Polyacetol resin + polyethylene resin |
| SAMPLE G | Polyacetol resin + polyethylene resin carbon fibers |

Table 1 lists seven slide member test samples, Sample A through Sample G. As illustrated in Table 1, each slide member test sample represents a slide member 22 made of a different material (that is, having a different major component). Drive experiments, adhesion experiments and abrasion experiments were conducted on each slide member test sample. As illustrated in Table 1, Sample E contains carbon paper in BT resin. The major components of Sample F are polyacetol resin (70 wt % or more) and polyethylene resin (5 wt % or more). Sample G contains carbon fibers (1 wt % or less) in addition to the components of Sample F.

TABLE 2

Results of Drive Efficiency Tests on the Ultrasonic motors

| SLIDE MATERIAL SAMPLE | MINIMUM CURRENT CONSUMPTION VALUE 1MIN (mA) | MAXIMUM DRIVE EFFICIENCY $\eta$ MAX (%) |
|---|---|---|
| SAMPLE A | 36.0 | 18.5 |
| SAMPLE B | 41.1 | 31.6 |
| SAMPLE C | 35.0 | 12.2 |
| SAMPLE D | 32.1 | 28.3 |
| SAMPLE E | 36.4 | 17.5 |
| SAMPLE F | 31.0 | 33.0 |
| SAMPLE G | 25.0 | 38.0 |

Table 2 indicates the results of drive experiments on Sample A through Sample G. A first drive experiment was based on fixed load torque. The first drive experiment determined the changes in electric current consumption when the drive frequency was changed from a high frequency to a low frequency. From the first experiment and as illustrated in the second column of Table 2, it was determined that the current consumption was the lowest, in order, of test samples G, F, and D.

In a second drive experiment, the drive efficiency was determined by keeping the drive frequency constant and changing the load torque. From the second drive experiment and as illustrated in the third column of Table 2, it was determined that the drive efficiency was relatively high, in order, of test samples G, F, B, and D.

TABLE 3

Results of Binding Tests on the Ultrasonic motor (peeling tangential force)

| SLIDE MATERIAL SAMPLE | TEST PIECE 1 | TEST PIECE 2 | TEST PIECE 3 |
|---|---|---|---|
| SAMPLE A | 0 | 0 | 0 |
| SAMPLE B | 0 | 0 | 0 |
| SAMPLE C | 0 | 400 | 500 |
| SAMPLE D | 0 | 0 | 0 |
| SAMPLE E | 500 | 500 | 500 |
| SAMPLE F | 0 | 0 | 0 |
| SAMPLE G | 0 | 0 | 0 |

Table 3 indicates the results of binding experiments related to the binding of slide member 22 and elastic body 11, for Sample A through Sample F. In Table 3, the units are gram-force (gf). In the binding experiments, slide member 22 was affixed to an aluminum block and was applied by pressure to elastic body 11 with approximately the same pressure applied to a slide member and elastic body in an actual ultrasonic motor. A conventional elastic body uses ferrous materials (such as stainless steel and invar) for its major components. In the binding experiments, three test pieces (test pieces 1–3) were exposed for long hours (180 hours) under conditions of high temperature and humidity (temperature 80 degrees C, humidity 90%). Afterwards, the aluminum block was pressed from a side surface, and the degree of binding was quantified by measuring the tangential force at the time of peeling off. From the binding experiments and as illustrated in Table 3, Samples A, B, D, F, and G produced no binding phenomenon, and it was found that these samples could be maintained in a stable state even under the relatively poor environment conditions that the samples were exposed to during the binding experiments.

TABLE 4

Results of Anti-Abrasion Property Tests

| SLIDE MATERIAL SAMPLE | ABRASIVE PARTICLE OUTPUT |
|---|---|
| SAMPLE A | A great deal adhering to the slide surface |
| SAMPLE B | A great deal adhering to the slide surface |
| SAMPLE C | A great deal |
| SAMPLE D | A minute amount |
| SAMPLE E | More than sample D |
| SAMPLE F | A minute amount |
| SAMPLE G | A minute amount |

Table 4 indicates the results of anti-abrasion property experiments performed on Sample A through Sample G. In the anti-abrasion property experiments, the test pieces were set to a fixed rotational frequency with a fixed load in an actual ultrasonic motor, and the manner of putting out abrasive particles after being rotated for a fixed amount of time, as well as the roughness conditions on the contact surface of sliding member 22, were observed. Based on the anti-abrasion property experiments and as illustrated in Table 4, Samples D, F, and G produced hardly any abrasive particles and were determined to have high anti-abrasive properties.

Also, when substituting polyethylene resin in Sample F and using other polyolefin group resins as a packing material, the same results were obtained as with the original Sample F. In addition, when using carbon powder, ceramic whiskers, glass fibers, aromatic polyamide-imide fibers, silicon oxide, carbon fibers or other combinations of these as the packing material, it was found that the anti-abrasive properties were further improved. The weight percent of the packing material at this time is 1% or less.

Based on the results of the above-described drive experiments, binding experiments and anti-abrasion property experiments, Samples D, F and G, comprising polyacetol resin as the major component, produced superior results as compared to the other samples. Generally, it was found that the drive efficiency of an ultrasonic motor, the chemical stability of the contact surfaces of the stator and the mobile element and the anti-abrasion properties of the stator and the mobile element could be increased by using polyacetol resins as the major component of slide member 22. In addition, it did not matter whether this polyacetol resin was a homopolymer (formaldehyde polymer) or a copolymer (trioxane and ethylene oxide copolymer).

Any of low density polyethylene, high density polyethylene, or ultra high molecular weight polyethylene may be used as packing material polyethylene resins, and antioxidants, anti-weather stabilizers, lubricants, and other additives may be added as necessary. In addition, the following may be used: (1) substances in which vinylacetate and ethylacrylate, etc. are copolymerized at several percent or more in addition to the alpha-olefins; (2) chloride and chlorosulfonate substances; and (3) substances which have ion bridges with copolymers of methacrylate and itaconic acid, etc.

Also, polypropylene resins may be used as polyolefin group resins other than polyethylene resins. In addition, bridge polypropylene, denatured polypropylene (polypropylene chloride, polypropylene chlorosulfonate, etc.), isotactic polybudene-1, and ethylene-propylene copolymers may be used as this polypropylene resin.

In an ultrasonic motor according to the above-described embodiments of the present invention, mobile element base member 21 and slide member 22 of mobile element 2 are formed as separate bodies; however, mobile element base member 21 and slide member 22 may be formed in a single body by a plastic material whose major component is a polyacetol resin. Further, slide member 22 can be provided on the contact surface side of stator 1, or elastic body 11 can be formed from a plastic material whose major component is acetol resin.

In an ultrasonic motor according to the above embodiments of the present invention, at least one of the stator contact part and the mobile element contact part comprise (a) a plastic material in which the major component is a polyacetol resin, and (b) a packing material such as polyolefin resin and carbon fibers. In an ultrasonic motor according to the above embodiments of the present invention, the drive efficiency, chemical stability and anti-abrasive properties of the motor can be increased.

Moreover, according to embodiments of the present invention, a motor is provided which includes an electro-mechanical conversion element (for example, electro-mechanical conversion element 12) that creates oscillations when an electrical signal is applied to the electro-mechanical conversion element; a stator (for example, stator 1) which is joined to the electro-mechanical conversion element and comprises an stator contact part (for example, elastic body 11); and a mobile element (for example, mobile element 2) comprising a mobile element contact part (for example, slide member 22) in contact with the stator contact part. When an electrical signal is applied to the electro-mechanical conversion element, the electro-mechanical conversion element creates oscillations in the stator contact part to drive the mobile element. At least one of the stator contact part and the mobile element contact part comprise a plastic material which has a polyacetol resin as a major component. The plastic material can also comprise a polyolefin resin. Further, the plastic material can additionally comprise at least one of the group comprising titanium oxide, silica, molybdenum disulfide and carbon powder.

The above embodiment of the present invention are not intended to be limited to an ultrasonic motor and may be applied to a linear type motor, an oscillation piece type motor and to all types of actuators.

Although a few preferred embodiments of the present invention have been shown and described, it will be appreciated by those skilled in the art that changes may be made in these embodiments, without departing from the principles and the spirit of the invention, the scope of which is defined in the claims and their equivalents.

What is claimed is:

1. A motor comprising:

an electro-mechanical conversion element which creates oscillations when an electrical signal is applied to the electro-mechanical conversion element;

a stator joined to the electro-mechanical conversion element and having an stator contact part; and a mobile element having a mobile element contact part in contact with the stator contact part and, when an electrical signal is applied to the electro-mechanical conversion element, the electro-mechanical conversion element creates oscillations in the stator contact part to drive the mobile element, at least one of the stator contact part and the mobile element contact part comprising a plastic material which has a polyacetol resin as a major component.

2. A motor as in claim 1, wherein the plastic material comprises polyolefin resin.

3. A motor as in claim 1, wherein the plastic material comprises at least one of the group comprising titanium oxide, silica, molybdenum disulfide and carbon powder.

4. A motor as in claim 2, wherein the plastic material comprises at least one of the group comprising titanium oxide, silica, molybdenum disulfide and carbon powder.

5. A motor as in claim 1, wherein the plastic material comprises at least one of the group comprising carbon fibers, ceramic whiskers, glass fibers and aromatic polyamideimide fibers.

6. A motor as in claim 2, wherein the plastic material comprises at least one of the group comprising carbon fibers, ceramic whiskers, glass fibers and aromatic polyamideimide fibers.

7. A motor as in claim 3, wherein the plastic material comprises at least one of the group comprising carbon fibers, ceramic whiskers, glass fibers and aromatic polyamideimide fibers.

8. A motor as in claim 4, wherein the plastic material comprises at least one of the group comprising carbon fibers, ceramic whiskers, glass fibers and aromatic polyamideimide fibers.

9. A motor as in claim 1 wherein the stator contact part is made of a ferrous metal.

10. A motor as in claim 2, wherein the stator contact part is made of a ferrous metal.

11. A motor as in claim 3, wherein the stator contact part is made of a ferrous metal.

12. A motor as in claim 4, wherein the stator contact part is made of a ferrous metal.

13. A motor as in claim 5, wherein the stator contact part is made of a ferrous metal.

14. A motor as in claim 6, wherein the stator contact part is made of a ferrous metal.

15. A motor as in claim 7, wherein the stator contact part is made of a ferrous metal.

16. A motor as in claim 8, wherein the stator contact part is made of a ferrous metal.

17. A motor as in claim 1, wherein the polyacetol resin of the plastic material has a weight ratio of approximately 70% or more.

18. A motor as in claim 2, wherein the polyacetol resin of the plastic material has a weight ratio of approximately 70% or more.

19. A motor as in claim 2, wherein the polyolefin resin is polypropylene resin.

20. A motor as in claim 6, wherein the polyolefin resin is polypropylene resin.

\* \* \* \* \*